UNITED STATES PATENT OFFICE.

IVAN LEVINSTEIN AND CARL MENSCHING, OF MANCHESTER, ENGLAND, ASSIGNORS TO THE LEVINSTEIN, LIMITED, OF SAME PLACE.

PROCESS OF MAKING ALPHYLAMIDONAPHTHOL-SULFONIC ACIDS.

SPECIFICATION forming part of Letters Patent No. 616,123, dated December 20, 1898.

Application filed June 14, 1897. Serial No. 640,774. (Specimens.)

*To all whom it may concern:*

Be it known that we, IVAN LEVINSTEIN, a subject of the Queen of Great Britain and Ireland, and CARL MENSCHING, a subject of the German Emperor, residing at Manchester, in the county of Lancaster, England, have invented certain new and useful improvements in the manufacture of a sulfonic acid which may be employed in the production of coloring-matters, of which the following is a specification.

This invention has been patented in Great Britain October 31, 1895, No. 20,548, and in France June 2, 1896, No. 256,863.

It has become known by the publication of the specification of the German Letters Patent No. 38,424 that if naphthol-sulfonic acids are heated with anilin and hydrochlorid of anilin they easily exchange their hydroxyl group for the phenylamido group, thus producing phenylamido-sulfonic acids; but up to the date of the present invention it had not been known that dioxynaphthalene-sulfonic acids may be converted into phenylamidoöxynaphthalene-sulfonic acids by treating them with anilin and hydrochlorid of anilin.

We have found that one of the hydroxyl groups in dioxynaphthalene-sulfonic acid G (see specification of British Letters Patent No. 9,642, dated June 11, 1889) may be substituted by a phenylamido or a tolylamido group if heated with anilin and hydrochlorid of anilin or with toluidin and hydrochlorid of toluidin, respectively.

In carrying out our present invention we may, by way of example, proceed as follows:

*Example—Production of the phenylamidonaphthol-sulfonic acid.*—Twenty-six kilos of the sodium salt of dioxynaphthalene-monosulfonic acid G, twenty-five kilos of anilin hydrochlorid, and one hundred kilos of anilin are heated in a suitable bath to about 160° centigrade for from two to three hours. The melt is made alkaline, and the excess of anilin is driven off by means of steam and recovered in the usual known manner. The filtered solution while being stirred is allowed to run into water acidulated with hydrochloric acid. The phenylamidoöxynaphthalene-sulfonic acid separates immediately as a grayish precipitate, which is filtered off and washed with water. It will be understood that if toluidin and toluidin hydrochlorid be substituted for the anilin and anilin hydrochlorid they will be employed in equivalent molecular proportions. The acid thus obtained may be used directly for the production of azo colors, as hereinafter described. It is soluble in hot water, but soluble with difficulty in cold, and crystallizes from its aqueous solution in the form of voluminous white needles. The sodium salt is easily soluble in water. If combined with diazo or tetrazo bodies, the acid produces valuable dyestuffs, and it is intended to be used for this purpose.

Having now particularly described and ascertained the nature of our said invention and in what manner the same is to be performed, we declare that what we claim is—

1. The process for the production of alphylamidonaphthol-sulfonic acids which consists in heating $beta_1$ $alpha_4$ dioxynaphthalene-$beta_3$ sulfonic acid with aromatic amins in the presence of means of condensation, such as the hydrochlorids of the aromatic amins, substantially as described.

2. The process for the production of a phenylamidonaphthol-sulfonic acid which consists in heating $beta_1$ $alpha_4$ dioxynaphthalene-$beta_3$ sulfonic acid with anilin and anilin hydrochlorid at temperatures from 120° to 160° centigrade, substantially as described.

IVAN LEVINSTEIN.
CARL MENSCHING.

In presence of—
WILLIAM E. HEYS,
ARTHUR MILLWARD.